C. W. S. HEATON.
Corn-Planter.

No. 37,754.

Patented Feb. 24. 1863.

Witnesses:

Inventor:

UNITED STATES PATENT OFFICE.

CHAS. W. S. HEATON, OF BELLEVILLE, ILLINOIS, ASSIGNOR TO J. J. PIGGOTT AND HENRY RENTCHLER, OF SAME PLACE.

IMPROVEMENT IN CORN-PLANTERS.

Specification forming part of Letters Patent No. 37,754, dated February 24, 1863.

*To all whom it may concern:*

Be it known that I, CHARLES W. S. HEATON, of Belleville, in the county of St. Clair and State of Illinois, have invented an Improved Machine for Planting Grain and Seeds in Hills and Drills; and I do hereby declare that the following is a full, clear, and exact description of the same, reference being had to the accompanying drawings, forming part of this specification, in which—

Figure 1:
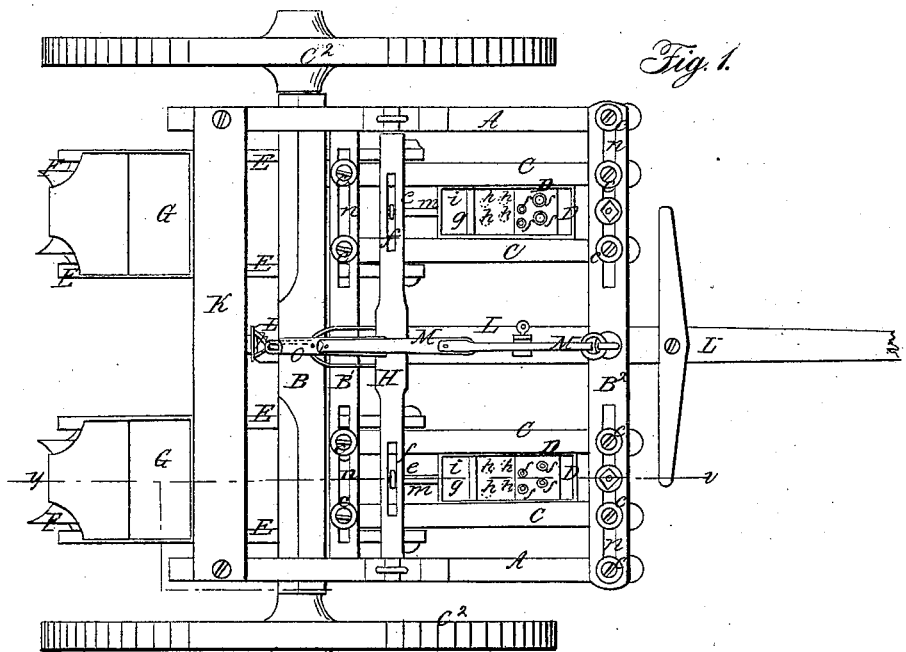
Figure 2:
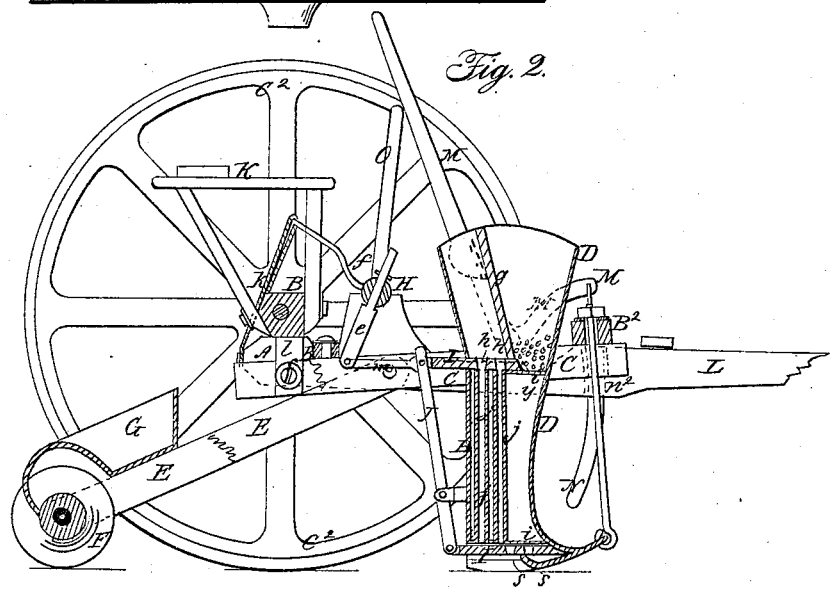

Figure 1 is a plan or top view of my machine. Fig. 2 is a vertical longitudinal section of the same in the line $y\,y$ of Fig. 1.

Similar letters of reference in the two figures indicate corresponding parts.

The object of the first part of my invention is to insure the planting of corn and other seeds in check-rows, and in a uniformly separated condition in the hills. To this end I have devised an arrangement of separate channels within the tooth or share of the machine, in connection with which alternately receiving and discharging valves are arranged to operate.

The object of the second part of my invention is to insure a proper covering of the corn or seeds during both damp and dry weather, and to this end I have devised a combined weight-box and scraper, to be arranged with respect to the covering-roller as hereinafter set forth.

The object of the third part of my invention is to insure a self-adjustment of the frame on which the planting mechanism is hung, and also provide for the ready adjustment of the same by hand or foot, and to this end I have hung the said frame on pivots located below and under the axle of the carriage, and in connection therewith have arranged the tongue of the carriage fast in the axle and combined the tongue and frame together by means of a goose-neck lever and a vertical guide.

The object of the fourth part of my invention is to so organize a corn-planter for dropping in check-rows that the width of the rows apart may be varied in different fields; and to this end I have slotted the rock-shaft which vibrates the valves, so that the arms to which the rods of the valve are attached may be adjusted laterally, and, in connection with such slotted rock-shaft, I have slotted the cross-timbers of the frame on which the planting mechanism is arranged.

To enable those skilled in the art to make and use my invention, I will proceed to describe its construction with reference to the drawings.

A A are the two side pieces of a frame, which are fastened by pivots $a$ to hangers $b$ of the axle-tree B in such manner that they can rise and descend at their front ends. The pivots $a$ are below the axle-tree. The axle-tree has wheels $C^2\,C^2$ on its outer ends.

$B^2$ is a front slotted cross-piece, and B' a back slotted cross-piece. These pieces unite the side pieces, A A, together. To the cross-pieces the tooth or share beams C C C C are bolted, so as to be adjusted laterally—that is, one set of tooth or share beams with its tooth or share D may be adjusted toward or from the other set; or both sets of tooth or share beams may be moved laterally toward or from one another, and thus the distance between the teeth or shares varied to suit the wants of the farmer. The retention of the tooth or share beams in position before or after adjustments are made is effected by means of joint bolts $c\,c$, which pass down through the slots $n$ of the cross-pieces and receive washers under their heads, while their lower ends enter nuts in the tooth or share beams. By slackening these bolts the desired adjustment may be made.

E E are pendent frames, which are fastened to the outside of the tooth or share beams C. To the rear end of these frames E E the coverers F F are fastened by means of a spindle or bolt, allowing the coverers to revolve freely as the machine is drawn along. On the frames E E, and forward of the covering-rollers, is arranged a box, G, the lower end of which is constructed so as to fit the form of the covering-rollers, and thus act upon the same in the capacity of a scraper, and thus keep the roller from clogging in damp weather or when the ground is moist. The chamber of the box serves to contain weights, which may be added or removed, according to necessity. For instance, in rainy seasons, when there is danger of covering the corn too deeply and causing it to "rot out," the weight, whatever it may be, is lightened, so as not to cover the corn too deeply or pack it into the ground; but in dry weather, when the ground cannot be packed too closely to make the seed germinate, the boxes G are loaded to their full capacity, or sufficiently so to insure the covering of the corn effectually.

H is a rock-shaft extending across the frame or carriage A A. To this shaft vibrating rods $e\ e$, which operate the mechanism of the teeth or shares, are attached in such a way that as the teeth or shares may be substituted by wider or narrower ones, or the teeth or shares set farther apart or nearer together, the vibrators can also be adjusted to correspond thereto. This is accomplished by making slots $f\ f$ through the rock-shaft and having the vibrators $e\ e$ extend through the same.

The teeth or shares D D are constructed in a novel manner, to wit: They have an upper hopper portion, which is divided into two chambers by a vertical partition, $g$, which has a brush, $y$, on its lower edge. The bottom $i$ of these chambers is horizontal, and through that portion of the bottom which belongs to the back chamber four holes, $h$, are cut. There are no perforations in the other part of the bottom. The holes $h$ are not formed on a square, but out of line with one another on a rhomb. This is to prevent all four grains from dropping down the first two channels, as would be the case if the holes were at right angles. There is a similarly-perforated bottom, $i'$, near the toe of the teeth or shares. The upper and lower bottoms, $i\ i'$, are connected together by means of four tubes, $j\ j\ j\ j$, which are set so as to form a communication with the holes in the two bottoms, said tubes being set so as to be inclosed by the tooth or share, and to discharge the corn in rhombs instead of squares.

I I' are valves, arranged with respect to the two bottoms $i\ i'$ as shown. These valves have four perforations each, which are set on a rhomb. The perforations $s$ of the valve I' are so operated with respect to the perforations of the valve I that they discharge corn into the ground while those of I are receiving corn from the hopper-chamber of the tooth or share. The two valves are connected together by a vibrating bar, J, which in turn is connected by a pitman or connecting-rod, $m$, to the rock-shaft H, as represented, said rock-shaft being under the tension of a spring, $k$.

K is the teamster's seat, mounted upon the axle-tree of the machine, and set back far enough to balance the forward weight of the machine when the driver is upon it and relieve the horses.

L is the tongue. It is fastened in the axle-tree permanently.

M is a goose-neck lever hinged to the cross-bar $B^2$ and to the top of the tongue.

N is a vertical guide projected down from the cross-bar $B^2$, and extending through a slot, $n^2$, in the tongue.

O is a hand-lever for operating the valves. The goose-neck lever is for operating the frame A A, so that the teeth or shares may be raised or lowered. The guide is to allow the teeth or shares and carriage-frame to play up and down automatically.

The operation of the planting mechanism is as follows: The corn is placed in the hopper, and when the lever is allowed to play inward— or, in other words, when the driver lets go of it—it of itself, by the action of the spring $k$, flies inward or forward, and the top valve, I, being made tapering, as shown, is forced under the corn in the hopper, this valve being furnished with four holes sufficiently large to hold each one grain of corn, but not two. Now, as the lever is drawn back by the driver, the valve I comes back, bringing four grains of corn, and as the apertures in the valve come in range with the tubes the corn falls into these tubes and descends upon the lower valve, I', and is there retained close to the ground. When the teeth or shares are in the act of crossing the "check" during the progress of the machine the operator lets go the lever and it reacts and assumes its normal position, and thus returns the valve I for a new charge of corn. As this occurs the lower valve moves outward and its holes come in range with the tubes, and the previously-retained corn is deposited on the ground instantaneously and in a uniform position.

My teeth or shares have many advantages. With any other corn-planter which employs two valves the corn is not conducted in a separated condition down upon the lower valve. This is not the case with my teeth or shares with tubes, channels, or other separate conductors. Another thing: It is impossible to make a valve which will always hold just four grains of corn. For instance, if the corn is large, it will only hold three, and if small it will hold five or six, while by making a separate cup for each grain, and a separate tube and a separate discharge therefor it is readily seen that, even should two small grains get in the cup, the brush $y$ will generally brush one out, and should an extra large one get in the cup, no matter how large, (within reason,) the brush will not be likely to get it out. This separation of the holes has been adopted in hand corn-planters; so, also, have four tubes been used in such planters; but in no instance, to my knowledge, have two valves with the channels or tubes been employed; nor is there an instance where the holes have been set on a rhomb for the purpose set forth.

I would here state that I do not limit myself to planting simply corn, as other seeds may be planted on the same plan; also, that I do not limit myself to any number of tubes in the teeth or shares or to any number of teeth or shares.

My machine is described and represented as a check-row corn-planter, as that was my principal object in designing it. I however intend to use the invention developed in the machine for planting wheat and other seed in drills; and in some cases I intend to have the slides operated by any of the well-known and approved automatic devices in use. I also may have the slides operated by a foot-lever, instead of a hand-lever.

If seed is planted in drills, the motion of the slides must be continuous, and it may be well to plug some of the seed-apertures in the slides, or at least in the upper slide. The changes, however, are optional with the farmer and the constructer of the machine.

The farmer may, if he desires, disconnect and remove the lower slide in planting wheat and other seeds smaller than corn in drills, or he may do so in planting corn in drills.

What I claim as my invention, and desire to secure by Letters Patent, is—

1. The employment of two alternating slide-valves in connection with separate channels, substantially as and for the purpose set forth.

2. The arrangement of the holes in the valves and the arrangement of the tubes on a rhomb instead of a square, for the purpose set forth.

3. The combination of the tooth or share, two valves, and a series of tubes or channels, substantially as and for the purpose set forth.

4. The employment of weight-boxes in connection with a coverer, the whole constructed substantially as and for the purpose described.

5. The arrangement of the devices above claimed in connection with the frame A A, goose-neck lever, slotted rock-shafts, all constructed and operating substantially as and for the purpose described.

CHAS. W. S. HEATON.

Witnesses:
BENJ. BONEAU,
CASPER THIELL.